Nov. 6, 1934.                C. S. REAMY                1,979,706
                              CAN COVER
                          Filed June 14, 1933
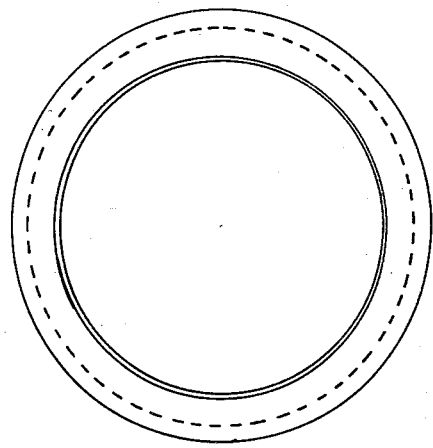
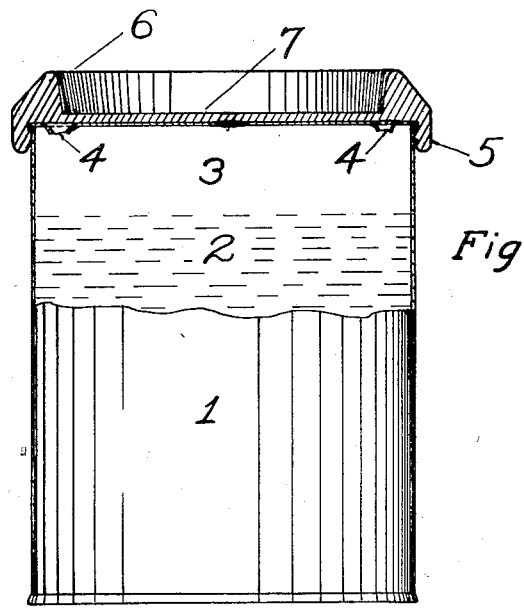
WITNESS
INVENTOR Patented Nov. 6, 1934

1,979,706

UNITED STATES PATENT OFFICE 1,979,706

CAN COVER

Christopher S. Reamy, Los Angeles, Calif.

Application June 14, 1933, Serial No. 675,743

1 Claim. (Cl. 220—24)

This invention has reference to devices for covering liquid containers providing an air-tight sanitary seal, the invention being hereinafter described in its preferred embodiment as applied to covers for evaporated milk cans. It is to be understood that in its broad aspects, the invention is not to be regarded as necessarily limited to covers for milk cans and that it may be embodied in a variety of devices of this general character which operate to cover liquid or other containers.

The outstanding feature of my invention is its extreme simplicity of construction and the ease with which it may be used for the purpose above stated. My improved can cover may be described briefly as a double cup-shaped cap of flexible material designed to fit closely over and around the top of can thereby preventing air or foreign matter entering the can.

There has been a long felt want for a suitable means for keeping evaporated milk cans covered and sanitary after being opened and a part of the milk used. My invention supplies this want to perfection.

The device is preferably made of flexible rubber, the details of which will be understood most readily and clearly from the following description, reference being had to the accompanying drawing, in which:

Fig. 1 is a partial central vertical section of a milk can of the large commercial size that has been opened in the usual way with my invention associated therewith.

Fig. 2 is a plan of my invention.

Referring to the drawing, 1 designates a large size commercial evaporated milk can, 2 the body of milk after a portion has been removed, 3 empty space, 4 the usual pierced openings in top of can, 5 flange of cover in sealed contact over and around the top of can, 6 is a flange similar to flange 5 but smaller, designed to fit similar cans of a smaller size, 7 is a diaphragm between the two flanges completing the seal of the cover for both sizes of cans.

In operating the device, it is but necessary to place the cover on the can and push down until diaphragm comes in contact with top of can. The can is then sealed and contents protected in a sanitary way from air or other contamination from the outside. The cover can easily be removed and replaced as often as part of contents of can is required.

Having thus described my invention, I claim:

The combination comprising, a liquid container, a covering device comprising a double cup-shaped cap of flexible material with a downward projecting annular flange around its edge shaped to fit the top of a container air-tight, and a similar flange projecting upward shaped to fit a smaller container in a like manner, adapted to be applied to evaporated milk cans and the like of different sizes and having a snug fitting contact over and around the top of can to provide a sanitary seal against contamination from the outside.

CHRISTOPHER S. REAMY.